United States Patent
Itagaki et al.

(10) Patent No.: US 11,064,452 B2
(45) Date of Patent: Jul. 13, 2021

(54) WIRELESS APPARATUS, PROCESSING METHOD FOR A WIRELESS APPARATUS, AND PROGRAM

(71) Applicant: Sony Corporation, Tokyo (JP)

(72) Inventors: Takeshi Itagaki, Saitama (JP); Junji Kato, Tokyo (JP); Hideyuki Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/313,902

(22) PCT Filed: Sep. 13, 2017

(86) PCT No.: PCT/JP2017/033039
§ 371 (c)(1),
(2) Date: Dec. 28, 2018

(87) PCT Pub. No.: WO2018/056138
PCT Pub. Date: Mar. 29, 2018

(65) Prior Publication Data
US 2019/0174445 A1    Jun. 6, 2019

(30) Foreign Application Priority Data
Sep. 23, 2016 (JP) .............................. JP2016-185329

(51) Int. Cl.
| | |
|---|---|
| H04W 56/00 | (2009.01) |
| H04N 21/43 | (2011.01) |
| H04R 27/00 | (2006.01) |
| H04R 5/00 | (2006.01) |

(Continued)

(52) U.S. Cl.
CPC ....... H04W 56/0015 (2013.01); H04J 3/0667 (2013.01); H04N 21/4305 (2013.01);
(Continued)

(58) Field of Classification Search
CPC . H04J 3/0667; H04W 56/0015; H04W 24/10; H04W 56/0035; H04W 56/004;
(Continued)

(56) References Cited

U.S. PATENT DOCUMENTS

| | | | |
|---|---|---|---|
| 2007/0226530 A1* | 9/2007 | Celinski | .................... G06F 1/12 713/500 |
| 2013/0077642 A1* | 3/2013 | Webb, III | ............. H04J 3/0697 370/503 |

(Continued)

FOREIGN PATENT DOCUMENTS

| | | | |
|---|---|---|---|
| JP | 2008-064474 A | 3/2008 | |
| JP | 2015-117941 A | 6/2015 | |

(Continued)

OTHER PUBLICATIONS

Extended European Search Report dated Aug. 21, 2019 in European Application No. 17852915.2-1219.

(Continued)

*Primary Examiner* — Awet Haile
(74) *Attorney, Agent, or Firm* — Xsensus LLP

(57) ABSTRACT

To precisely synchronize system clocks, medium clocks, or the like of apparatuses with each other.

A wireless apparatus includes a main control unit and a wireless control unit. Information regarding a correspondence between a clock that manages a time of the main control unit and a clock that manages a time of the wireless control unit is wirelessly sent to another wireless apparatus by the wireless control unit. This information regarding the correspondence includes information regarding a difference between the two clocks, information regarding a granularity ratio of the two clocks, and the like. For example, the wireless control unit sends the information regarding the correspondence as a part of a frame for measuring the time (Continued)

of the wireless control unit with respect to the other wireless apparatus or a part of a frame for connecting to the other wireless apparatus.

20 Claims, 12 Drawing Sheets

(51) Int. Cl.
  *H04J 3/06* (2006.01)
  *H04W 84/12* (2009.01)
(52) U.S. Cl.
  CPC ......... *H04N 21/4307* (2013.01); *H04R 5/00* (2013.01); *H04R 27/00* (2013.01); *H04R 2227/003* (2013.01); *H04R 2420/07* (2013.01); *H04W 84/12* (2013.01)
(58) Field of Classification Search
  CPC ............ H04W 72/0446; H04W 84/12; H04N 21/4305; H04N 21/4104; H04R 2227/003; H04R 2420/07; H04R 5/00
  See application file for complete search history.

(56) References Cited

U.S. PATENT DOCUMENTS

| | | | |
|---|---|---|---|
| 2014/0213193 A1* | 7/2014 | Zhang | ................. H04W 56/004 455/67.11 |
| 2015/0249967 A1 | 9/2015 | Kafle et al. | |
| 2016/0147600 A1* | 5/2016 | Gao | ...................... G06F 11/108 714/764 |
| 2016/0262122 A1* | 9/2016 | Aldana | ................. H04W 24/10 |

FOREIGN PATENT DOCUMENTS

| | | |
|---|---|---|
| WO | 2006/110960 A1 | 10/2006 |
| WO | 2015/125439 A1 | 8/2015 |
| WO | 2015/171435 A1 | 11/2015 |
| WO | 2016/140792 A1 | 9/2016 |

OTHER PUBLICATIONS

International Search Report dated Dec. 12, 2017 for PCT/JP2017/033039 filed on Sep. 13, 2017, 9 pages including English translation.

IEEE, "IEEE Standard for a Precision Clock Synchronization Protocol for Networked Measurement and Control Systems", IEEE Std 1588™, Jul. 24, 2008, 289 pages.

IEEE, "Wireless LAN Medium Access Control(MAC) and Physical Layer (PHY) Specifications", IEEE P802.11-REVmc™/D8.0, Aug. 2016, 3774 pages.

IEEE, "Timing and Synchronization for Time-Sensitive Applications in Bridged Local Area Networks", IEEE Computer Society, IEEE Std 802.1AS™, Mar. 30, 2011, 292 pages.

* cited by examiner

Operation overview of IEEE1588 Precision Time Protocol

Operation overview of IEEE802.11 Fine Timing Measurement Protocol

Format of FTM Action Frame

| MAC header | Category (Public) | Public Action (FTM) | Dialog Token | Follow Up Dialog Token | ToD | ToA | ToD Error | ToA Error |

WIRELESS APPARATUS, PROCESSING METHOD FOR A WIRELESS APPARATUS, AND PROGRAM

CROSS-REFERENCE TO RELATED APPLICATIONS

This application is a National Stage Application based on PCT/JP2017/033039, filed on 13 Sep. 2017, and claims priority to Japanese Patent Application No. 2016-185329, filed on 23 Sep. 2016, the entire contents of which being incorporated herein by reference.

TECHNICAL FIELD

The present technology relates to a wireless apparatus, a processing method for a wireless apparatus, and a program.

BACKGROUND ART

In performing time synchronization between two wireless apparatuses connected to each other via a wireless LAN, each of which includes clock counters having different granularities and bit widths, which are a clock (system clock) to be used by a main control unit and a clock (network interface card clock (NIC clock)) of a wireless control unit, (A) or (B) below is conceivable as a method of synchronizing the system clocks of the apparatuses with each other via the wireless control units, for example.
(A) Method Using PTP at IP Layer Level By using frames in a format conforming to an IEEE1588 precision time protocol (PTP), that is, a SYNC frame, a FOLLOW_UP frame, a PDELAY_Req frame, and a PDELAY_Resp frame, frame exchange thereof is performed through a wireless medium for synchronizing the system clocks with each other (see Non-Patent Literature 1). In this case, regarding the format, all system clock values can be transmitted. Meanwhile, due to its format assuming that time stamps are added in an upper-level layer, there is a disadvantage that the synchronization precision is lowered.
(B) Method Utilizing Clock Synchronization at a Wireless-Layer Level By using a fine timing measurement (FTM) protocol defined by a P802.11REVmc-D8.0 standard, a deviation between the NIC clocks of the apparatuses is first determined and synchronization is performed (see Non-Patent Literature 2). After that, the time value of the network interface card (NIC) clocks is reflected to the system clocks.

However, with the format of the field for expressing the time of the NIC clock in the FTM Action frame used for the FTM protocol, the entire system clock cannot be expressed due to the differences of the bit width and the granularity in some cases. For example, it is assumed that, the system clock is expressed by a 64-bit signed integer in nanosecond (ns) and the NIC clock is expressed by a 48-bit signed integer in picosecond (ps).

In this case, the system clock can express an arbitrary time within a period until about A.D. 300 billion at most. Meanwhile, the NIC clock can express only values in about 140 seconds. Therefore, although it is possible to detect a deviation between the NIC clocks of the apparatuses by using the FTM protocol and synchronize the counts with each other, when trying to synchronize the system clocks of the apparatuses with each other, some pieces of time information can be lost due to digits and the granularity.

It should be noted that by using an extended format as the FTM frame format, a field called "preciseOriginTimestamp", which can write a time in a format corresponding to the system clock (64-bit value in ns), can be added (see Non-Patent Literature 3). Although the lost information can be covered by writing a value of the system clock in this field, the value of the system clock which should be written here needs to be a value corresponding to a timing of ToD (or ToA) which is a value of the NIC clock. If not so, the correspondence between the NIC clock and the system clock cannot be established. To establish the correspondence between the NIC clock and the system clock is an original object. However, the NIC clock which is a source of the time of the ToD (or ToA) is present at the wireless control unit and the system clock is present at the main control unit. Therefore, the wireless control unit needs to generate a field while grasping the value of the clock of the main control unit. The implementation is difficult.

CITATION LIST

Non-Patent Literature

Non-Patent Literature 1: 1588-2008-IEEE Standard for a Precision Clock Synchronization Protocol for Networked Measurement and Control Systems Non-Patent Literature 2: IEEE P802.11-REVmcTM/D8.0, August 2016 Draft Standard for Information technology?Telecommunications and information exchange between systems Local and metropolitan area networks?Specific requirements Part 11: Wireless LAN Medium Access Control (MAC) and Physical Layer (PHY) Specifications Timing and Synchronization for Time-Sensitive Applications in Bridged Local Area Networks Non-Patent Literature 3: IEEE Std 802.1AS?-2011, IEEE Standard for Local and metropolitan area networks?Timing and Synchronization for Time-Sensitive Applications in Bridged Local Area Networks

DISCLOSURE OF INVENTION

Technical Problem

It is an object of the present technology to precisely synchronize system clocks, medium clocks, or the like of apparatuses with each other.

Solution to Problem

In accordance with a concept of the present technology, a wireless apparatus includes:
a main control unit; and
a wireless control unit that wirelessly sends information regarding a correspondence between a clock that manages a tune of the main control unit and a clock that manages a time of the wireless control unit to another wireless apparatus, the information regarding the correspondence including information regarding a difference between the two clocks.

In the present technology, the wireless apparatus includes the main control unit and the wireless control unit. Tire information regarding the correspondence between the clock that manages the time of the main control unit and the clock that manages the time of the wireless control unit is wirelessly sent to the other wireless apparatus by the wireless control unit. This information regarding the correspondence includes the information regarding the difference between the two clocks.

For example, the information regarding the correspondence may further include information regarding a granularity ratio of the two clocks. Further, for example, the wireless control unit may send the information regarding the correspondence as a part of a frame for measuring the time of the wireless control unit with respect to the other wireless apparatus. Further, for example, the wireless control unit may send the information regarding the correspondence as a part of a frame for connecting to the other wireless apparatus.

As described above, in the present technology, the information regarding the correspondence between the clock (system clock) that manages the time of the main control unit and the clock that manages the time of the wireless control unit is wirelessly sent to the other wireless apparatus. Therefore, in the other wireless apparatus, the system clock of its own apparatus can be corrected by converting the clock that manages the time of the wireless control unit of its own apparatus into the system clock of its own apparatus on the basis of the information regarding the correspondence, and it becomes possible to precisely synchronize the system clocks of the apparatuses with each other.

It should be noted that in the present technology, for example, the wireless apparatus may further include an audio reproduction processing unit that wirelessly receives audio data from an external apparatus and drives a speaker by performing reproduction processing on the basis of the clock that manages the time of the main control unit. In this case, the reproduction processing in the audio reproduction processing unit can be precisely synchronized and performed between the apparatuses.

Further, in the present technology, for example, the wireless apparatus may further include an audio reproduction processing unit that wirelessly sends audio data to an external apparatus and drives a speaker by performing reproduction processing on the basis of the clock that manages the time of the main control unit also by itself. In this case, the reproduction processing in the audio reproduction processing unit can be precisely synchronized and performed between the apparatuses.

Further, in accordance with another concept of the present technology,
   a wireless apparatus includes:
   a main control unit;
   a wireless control unit that receives, from another wireless apparatus, information regarding a correspondence between a clock that manages a time of a main control unit and a clock that manages a time of a wireless control unit in the other wireless apparatus, the information regarding the correspondence including information regarding a difference between the two clocks; and
   a correction unit that corrects a clock that manages a time of the main control unit of its own apparatus by converting the clock that manages a time of the wireless control unit of its own apparatus into the clock that manages the time of the main control unit of its own apparatus on the basis of the information regarding the correspondence.

In the present technology, the wireless apparatus includes the main control unit and the wireless control unit. The information regarding the correspondence between the clock that manages the time of the main control unit and the clock that manages the time of the wireless control unit in this other wireless apparatus is received from the other wireless apparatus by the wireless control unit. The information regarding the correspondence includes the information regarding the difference between the two clocks. For example, the information regarding the correspondence may further include information regarding a granularity ratio of the two clocks.

The clock that manages the time of the main control unit of its own apparatus is corrected by the correction unit converting the clock that manages the time of the wireless control unit of its own apparatus into the clock that manages the time of the main control unit of its own apparatus on the basis of the information regarding the correspondence.

As described above, in the present technology, the system clock of its own apparatus is corrected by converting the clock that manages the time of the wireless control unit of its own apparatus into the clock (system clock) that manages the time of the main control unit of its own apparatus on the basis of the information regarding the correspondence, which is received from the other wireless apparatus. Therefore, it becomes possible to precisely synchronize the system clocks of the apparatuses with each other.

It should be noted that in the present technology, for example, the wireless apparatus may further include an audio reproduction processing unit that wirelessly receives audio data from an external apparatus and drives a speaker by performing reproduction processing on the basis of the clock that manages the time of the main control unit. In this case, the reproduction processing in the audio reproduction processing unit can be precisely synchronized and performed between the apparatuses.

Further, in the present technology, for example, the wireless apparatus may further include an audio reproduction processing unit that wirelessly sends audio data to an external apparatus and drives a speaker by performing reproduction processing on the basis of the clock that manages the time of the main control unit also by itself. In this case, the reproduction processing in the audio reproduction processing unit can be precisely synchronized and performed between the apparatuses.

Further, in accordance with another concept of the present technology,
   a wireless apparatus includes:
   a medium processing unit; and
   a wireless control unit that wirelessly sends information regarding a correspondence between a clock that manages a time of the medium processing unit and a clock that manages a time of the wireless control unit to another wireless apparatus, the information regarding the correspondence including information regarding a difference between the two clocks.

In the present technology, the wireless apparatus includes the medium processing unit and the wireless control unit. The information regarding the correspondence between the clock that manages the time of the medium processing unit and the clock that manages the time of the wireless control unit is wirelessly sent to the other wireless apparatus by the wireless control unit. This information regarding the correspondence includes the information regarding the differences between the two clocks. For example, the information regarding the correspondence may further include information regarding a granularity ratio of the two clocks.

As described above, in the present technology, the information regarding the correspondence between the clock (medium clock) that manages the time of the medium processing unit and the clock that manages the time of the wireless control unit is wirelessly sent to the other wireless apparatus. Therefore, in the other wireless apparatus, the medium clock of its own apparatus can be corrected by converting the clock that manages the time of the wireless control unit of its own apparatus into the medium clock of its own apparatus on the basis of the information regarding the correspondence, and it becomes possible to precisely synchronize the medium clocks of the apparatuses with each other.

It should be noted that in the present technology, for example, the medium processing unit may wirelessly receive audio data from an external apparatus and drive a speaker by performing reproduction processing on the basis of the clock that manages the time of this medium processing unit. In this case, the reproduction processing of the audio data in the medium processing unit can be precisely synchronized and performed between the apparatuses.

Further, in the present, technology, for example, the medium processing unit may wirelessly send audio data to an external apparatus and drive a speaker by performing reproduction processing on the basis of the clock that manages the time of this medium processing unit also by itself. In this case, the reproduction processing of the audio data in the medium processing unit can be precisely synchronized and performed between the apparatuses.

Further, in accordance with another concept of the present technology,
a wireless apparatus includes:
a medium processing unit;
a wireless control unit that receives, from another wireless apparatus, information regarding a correspondence between a clock that manages a time of the medium processing unit and a clock that manages a time of the wireless control unit in the other wireless apparatus, the information regarding the correspondence including information regarding a difference between the two clocks; and
a correction unit that corrects a clock that manages a time of the medium processing unit of its own apparatus by converting a clock that manages a time of the wireless control unit of its own apparatus into the clock that manages the time of the medium processing unit of its own apparatus on the basis of the information regarding the correspondence.

In the present technology, the wireless apparatus includes the medium processing unit and the wireless control unit. The information regarding the correspondence between the clock that manages the time of the medium processing unit and the clock that manages the time of the wireless control unit in this other wireless apparatus is received from the other wireless apparatus by the wireless control unit. The information regarding the correspondence includes the information regarding the difference between the two clocks. For example, the information regarding the correspondence may further include information regarding a granularity ratio of the two clocks. The medium clock of its own apparatus is corrected by the correction unit converting the clock that manages the time of the wireless control unit of its own apparatus into the clock that manages the time of the medium processing unit of its own apparatus on the basis of the information regarding the correspondence.

As described above, in the present technology, the medium clock of its own apparatus is corrected by converting the clock that manages the time of the wireless control unit of its own apparatus into the clock (medium clock) that manages the time of the medium processing unit of its own apparatus on the basis of the information regarding the correspondence, which is received from the other wireless apparatus. Therefore, it becomes possible to precisely synchronize the medium clocks of the apparatuses with each other.

It should be noted that in the present technology, for example, the medium processing unit may wirelessly receive audio data from an external apparatus and drive a speaker by performing reproduction processing on the basis of the clock that manages the time of this medium processing unit. In this case, the reproduction processing of the audio data in the medium processing unit can be precisely synchronized and performed between the apparatuses.

Further, in the present technology, for example, the medium processing unit may wirelessly send audio data to an external apparatus and drive a speaker by performing reproduction processing on the basis of the clock that manages the time of this medium processing unit also by itself. In this case, the reproduction processing of the audio data in the medium processing unit can be precisely synchronized and performed between the apparatuses.

Advantageous Effects of Invention

In accordance with the present technology, it becomes possible to precisely synchronize system clocks, medium clocks, or the like of apparatuses with each other. It should be noted that the effects described here are not necessarily limitative and any effect described in the present disclosure may be provided.

BRIEF DESCRIPTION OF DRAWINGS

FIG. 3 A diagram showing a format of an FTM action frame.

FIG. 4 A diagram showing a format of an extended FTM action frame in a case where an 802.1AS standard and an 802.11 FTM protocol are used in combination.

MODE(S) FOR CARRYING OUT THE INVENTION

Hereinafter, a mode for carrying out the invention (hereinafter, referred to as "embodiment") will be described. It should be noted that descriptions will be given in the following order.
1. Embodiment
2. Modified Example

1. Embodiment

"Description of a Reference Standard"

A standard to be referred will be described. An IEEE1588 standard "1588-2008-IEEE Standard for a Precision Clock Synchronization Protocol for Networked Measurement and Control Systems" is defined as a correction method for performing high-precision time synchronization between the apparatuses. A protocol of this standard is also called precision time protocol (PTP).

Figure 1:
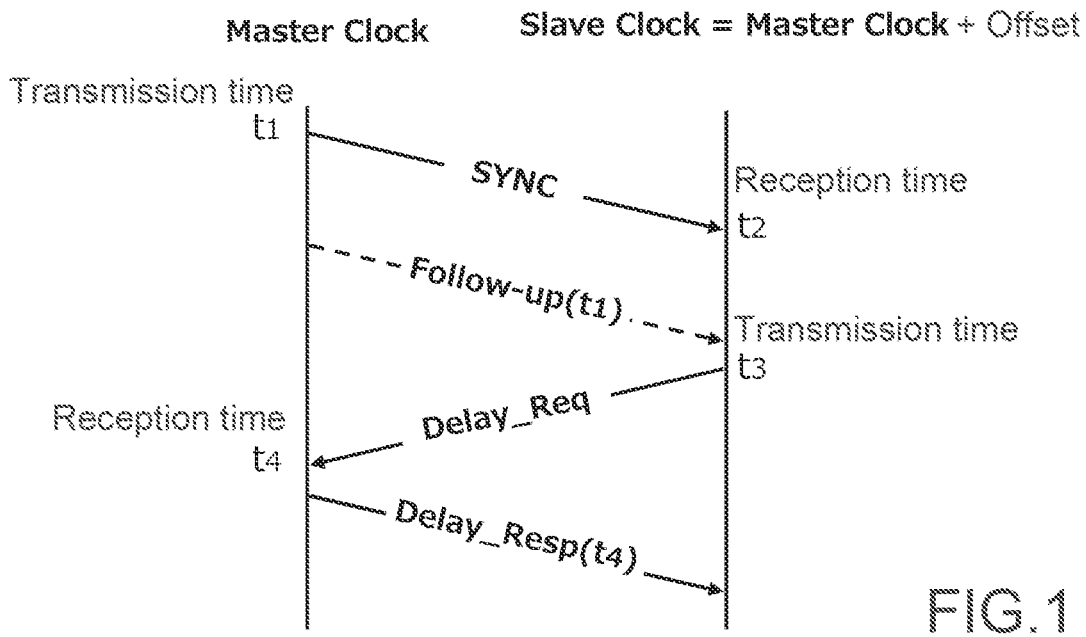
FIG. 1 A diagram showing an operation overview of a PTP.

FIG. 1 shows an operation overview of the PTP. Although a detailed description will be omitted, a time deviation between a master to a slave is expressed by Expression (1) below by using the time in FIG. 1.

[Expression 1]

$$\text{offset} = \frac{1}{2}\{(t_2 - t_1) - (t_4 - t_3)\} \quad (1)$$

Further, an 802.1AS standard "802.1AS-2011-IEEE Standard for Local and Metropolitan Area Networks—Timing and Synchronization for Time-Sensitive Applications in Bridged Local Area. Networks" is defined as an upper-level layer standard defining a function for the use in a local area network (LAN) with respect to the PTP method. In this standard, a master-clock selection algorithm and a clock relaying method not depending on a communication system of a lower-level layer while referring to the IEEE1588 standard and an interface for providing a dedicated measurement mechanism for more precisely calculating a time deviation for a communication system of some lower-level layers are respectively defined.

Further, a fine timing measurement (FTM) protocol based on the PTP concept is defined by a P802.11REVmc-D8.0 standard as a protocol that performs high precision synchronization (time deviation detection) between the wireless apparatuses in a case where an IEEE802.11 wireless LAN is used as the communication system of the lower-level layer to be combined with the 802.1AS standard.

Figure 2:
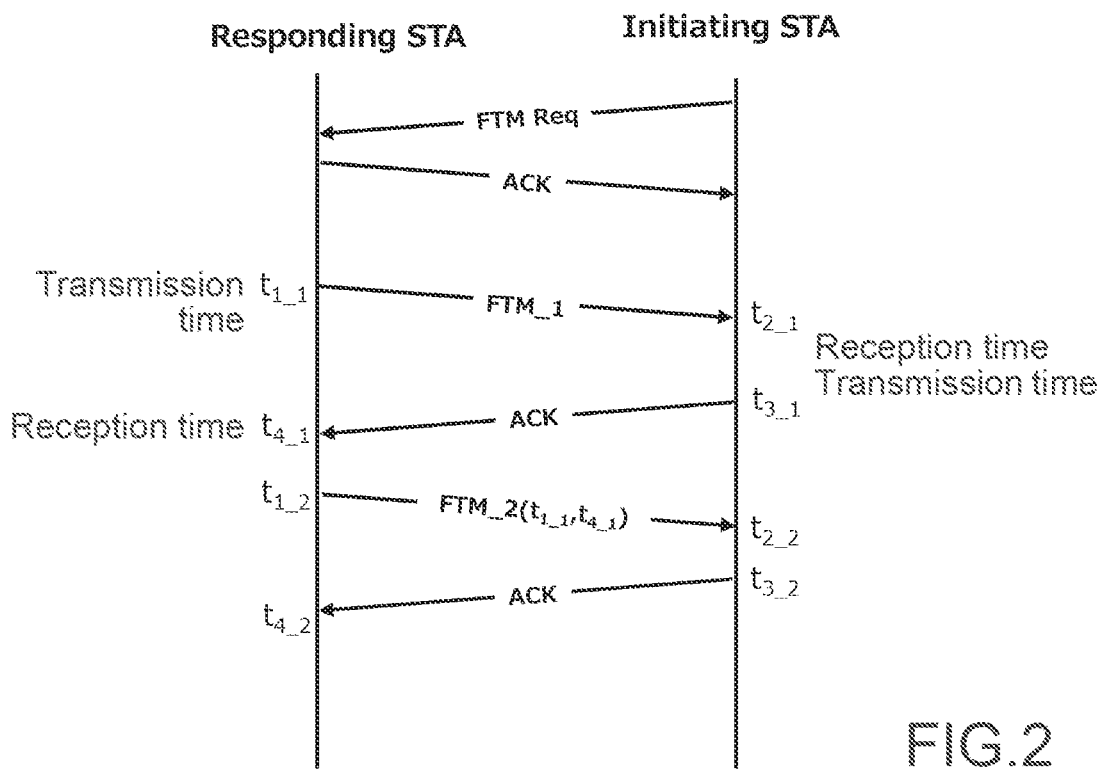
FIG. 2 A diagram showing an operation overview of an FTM protocol.

FIG. 2 shows an operation overview of the FTM protocol. A time deviation between the master (responder in the figure) and the slave (initiator in FIG. 2) is similarly obtained by replacing t1 to t4 by t1_1 to t1_4 in the Expression (1).

FIG. 3 shows a format of an FTM action frame which is a measurement frame for measuring a time of a wireless control unit with respect to another wireless apparatus in FIG. 2. In this format, a portion corresponding to a payload of the FTM action frame is the "Dialog Token" field and the fields following the "Dialog Token" field. The "Dialog Token" field and the "Follow Up Dialog Token" field are indexes for establishing a correspondence between FTM action frames sent a plurality of times.

The "Follow Up Dialog Token" field indicates which one of previously sent FTM action frames the "ToD" field and the "ToA" field to be described subsequent thereto are made to correspond to.

In the "ToD" field and the "ToA" field, time information (time stamp) corresponding to t1_1 and time information (time stamp) corresponding to t4_1 in FIG. 2 are each described as 48-bit values in ps. In each of the "ToD Error" field and the "ToA Error" field, information indicating a maximum error between the time stamp of "ToD" and the time stamp of "ToA" is input.

Figure 4:
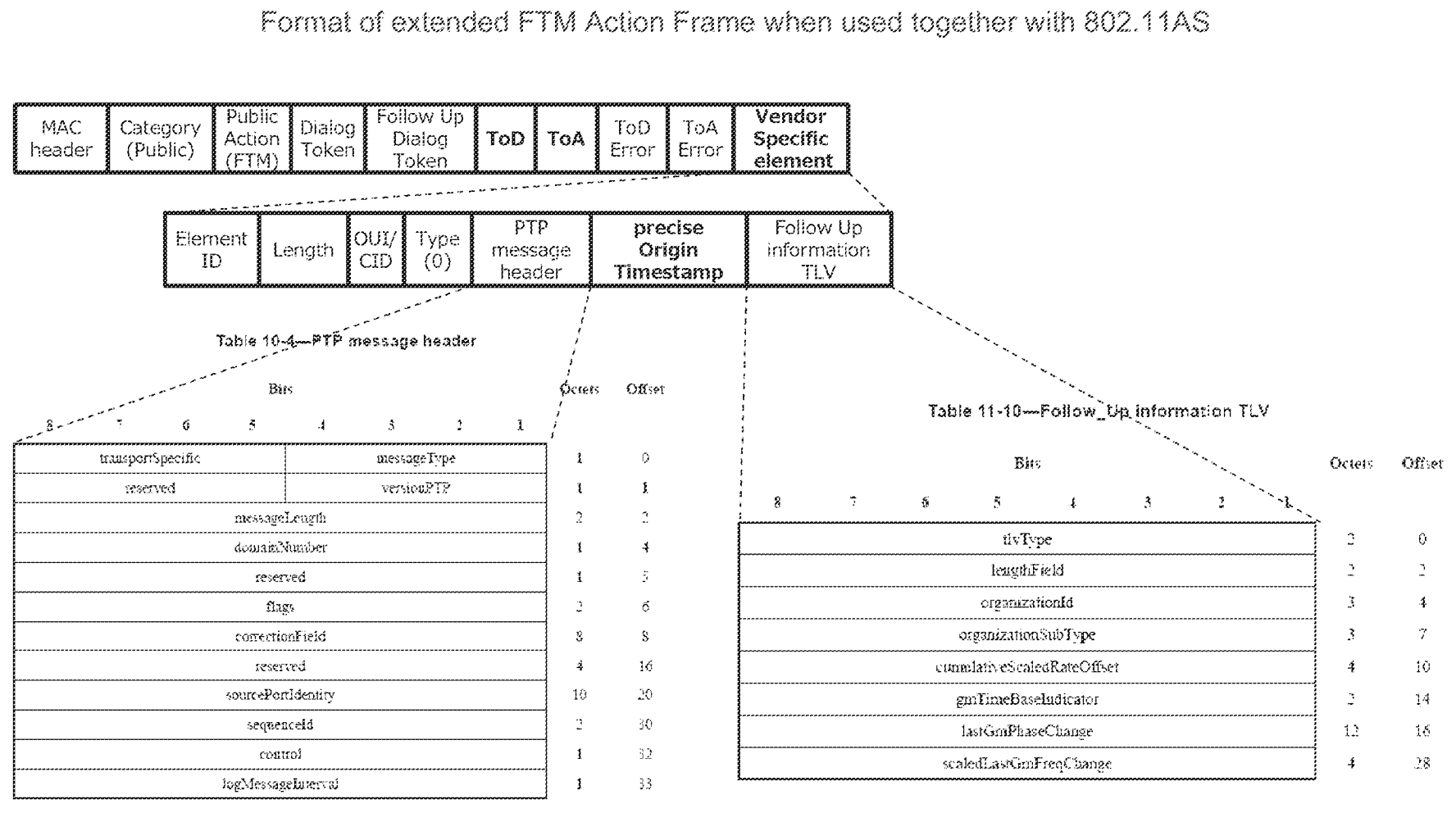

FIG. 3 shows the format in a case where only the FTM protocol is used. An extended FTM action frame is used in a case where the 802.1AS standard and an 802.11 FTM protocol are used in combination. FIG. 4 shows a format thereof. A vendor specific element is newly added. This element is used for describing necessary information in relaying and sending the time of another grand master clock.

Figure 5:
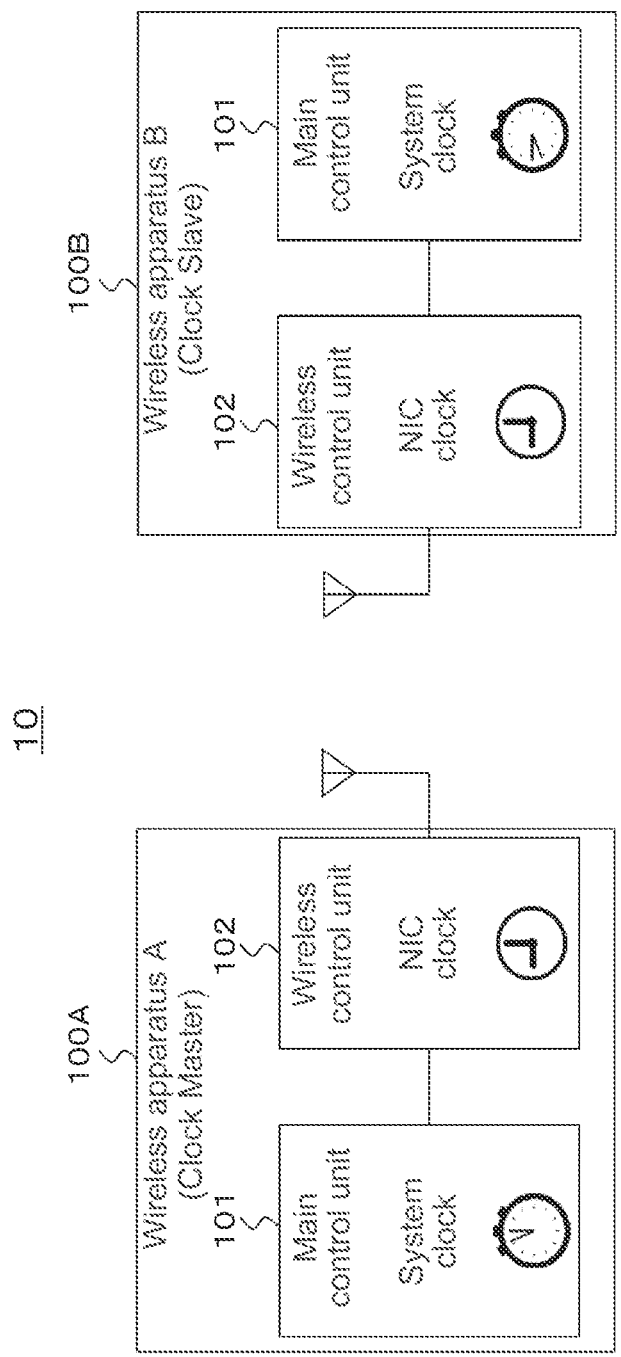
FIG. 5 A block diagram showing a configuration example of a wireless system as an embodiment.

FIG. 5 shows a configuration example of the wireless system 10 as the embodiment. This wireless system 10 includes a wireless apparatus 100A and a wireless apparatus 100B. In this embodiment, it is assumed that the wireless apparatus 100A is a wireless apparatus A which is a clock master and the wireless apparatus 100B is a wireless apparatus B which is a clock slave.

The wireless apparatuses 100A and 100B each include a main control unit 101 and a wireless control unit 102. The main control unit 101 is a portion corresponding to a host processor of the apparatus and executes application programs, controls input/output signals of a user interface, and performs communication protocol processing of mainly a network layer and upper-level layers. Examples of the input/output of the user interface include timing control to output audio and video as well as input of operation signals.

The wireless control unit 102 is a functional block that serves all functions of a wireless protocol of a communication layer mainly including a data link layer and lower-level layers, such as addition, analysis, modulation/demodulation, error correction coding and decoding, and amplification of a data link layer header with respect to upper-level layer packets generated by the main control unit 101. In general, the wireless control unit 102 is a device independent from the main control unit 101 and is connected to the main control unit 101 via a certain I/O port.

The main control unit 101 includes a system clock. The system clock is a clock that manages a time of the main control unit 101. The system clock is managed and referred by the main control unit 101. The wireless control unit 102 includes an NIC clock. The NIC clock is a clock that manages a time of the wireless control unit 102. The NIC clock is managed and referred by the wireless control unit 102.

A wireless transmission time and a reception start time of a frame as the time of t1_1 (ToD) and t4_1 (ToA) described above need to be described as accurately as possible. In order to detect a transmission timing and a reception timing without deviations, the NIC clock is used. It should be noted that although the example in which a single wireless apparatus which is the clock slave is provided is shown in the configuration example of FIG. 5, an example in which two or more wireless apparatuses which is clock slaves are provided is also conceivable.

In this embodiment, the synchronization between the system clocks of the two wireless apparatuses 100A and 100B that constitute the communication system 10 is performed in accordance with the following procedure. It should be noted that it is assumed that an operation of connecting the wireless apparatus 100A to the wireless apparatus 100B and determination of clock roles indicating whether it is the clock master or the clock slave are finished.

Figure 6:
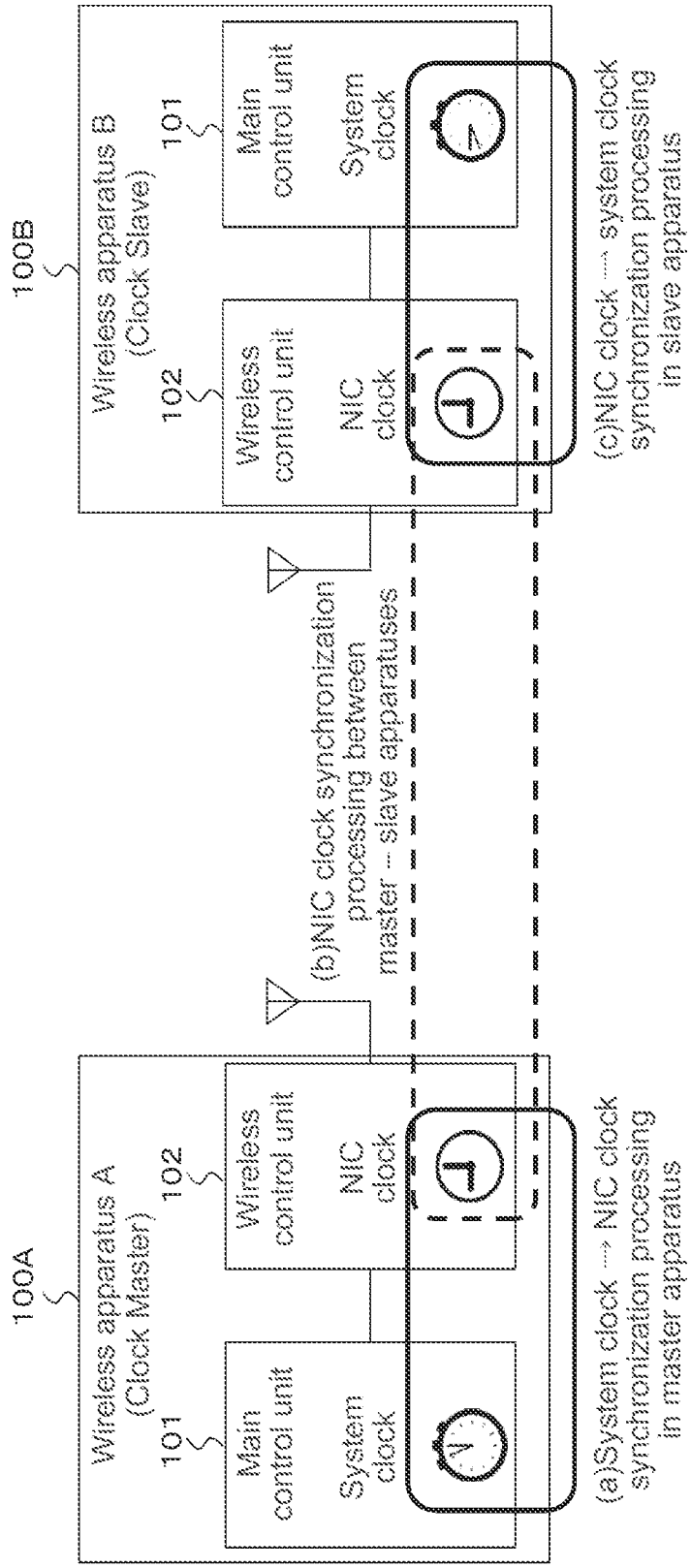
FIG. 6 A diagram showing a synchronization procedure for system clocks of two wireless apparatuses.

FIG. 6 shows a synchronization procedure for the system clocks of the two wireless apparatuses 100A and 100B. Hereinafter, descriptions will be given, classified into three types of processing of (a) to (c). It should be noted that those types of processing may be performed in parallel.

"As Synchronization Processing of System Clock→NIC clock (in Wireless Apparatus A)"

Figure 7:
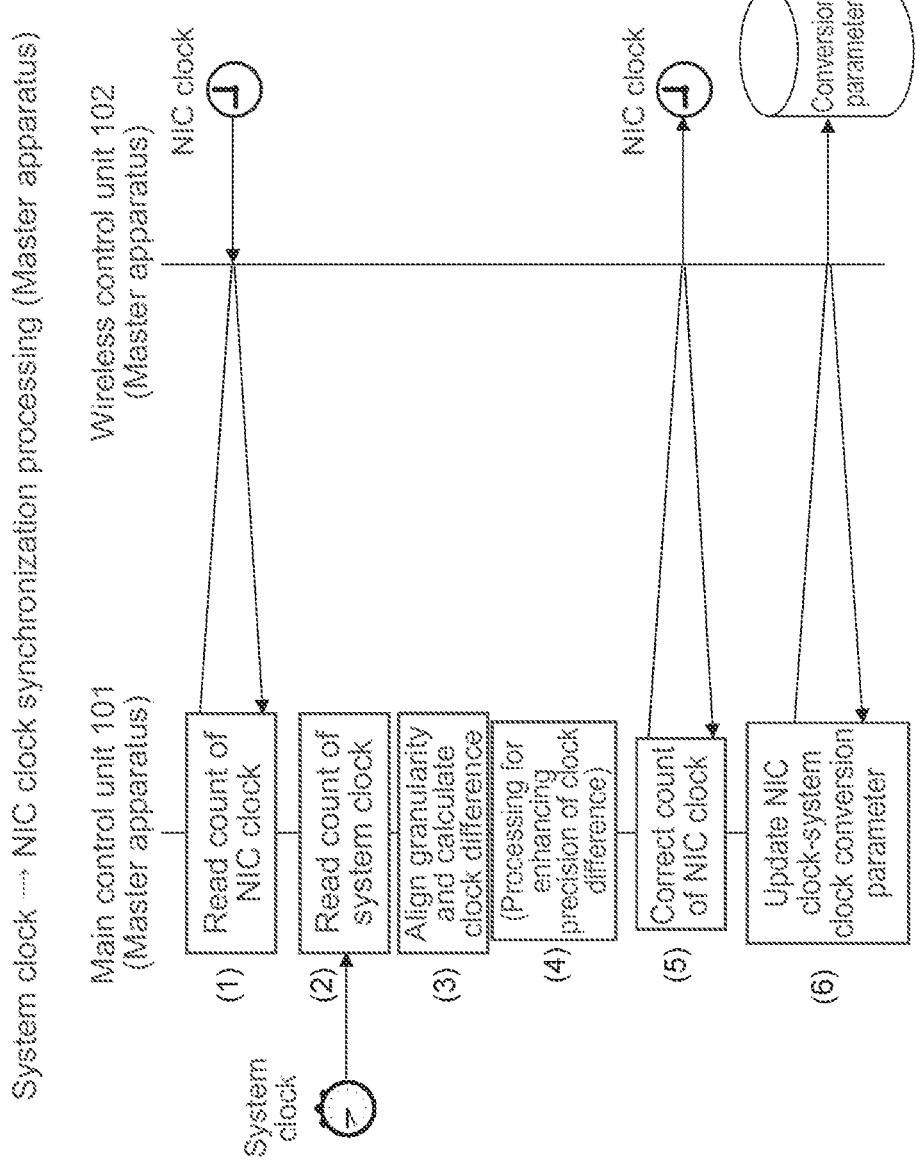
FIG. 7 A diagram showing a flow of processing of reflecting a time of the system clock to the NIC clock at the wireless apparatus A which is a master apparatus.

This processing is processing of reflecting the time of the system clock to the NIC clock at the wireless apparatus A (wireless apparatus 100A) which is a master apparatus. FIG. 7 shows a processing flow.

(1) First of all, the main control unit 101 reads a count of the NIC clock at the wireless control unit 102.

(2) Next, the main control unit 101 reads a count of the system clock.

(3) Next, the main control unit 101 calculates a system clock-NIC clock difference by aligning the granularity of the NIC clock with the granularity of the system clock.

(4) Next, the main control unit 101 performs processing for enhancing the precision on the difference value. For example, a delay of an interface between the main control unit 101 and the wireless control unit 102 and a processing delay are estimated by previous measurement. A difference value from which influences thereof are removed in advance is set as a time which should be corrected. It should be noted that this processing for enhancing the precision is performed in a manner that depends on needs and does not need to be performed.

(5) Next, the main control unit 101 corrects the count of the NIC clock of the wireless control unit 102 on the basis of the calculated system clock-NIC clock difference.

(6) Finally, the main control unit 101 causes the wireless control unit 102 to save supplementary information for generating a system clock value from the NIC clock (hereinafter, referred to as a "conversion parameter") in view of the fact that the NIC clock cannot express all pieces of information of the system clock. This conversion parameter constitutes information regarding a correspondence between the system clock and the NIC clock.

The conversion parameter is specifically information regarding a granularity ratio and information regarding a count difference between the system clock and the NIC clock. The granularity ratio depends on the format of the clock counter of the main control unit 101 and the clock counter of the wireless control unit 102 and is a value depending on a combination of an operating system (OS) and a device. In order to obtain this value, the name and version of the OS may be utilized.

The count difference is a difference value aiming at supplying a digit deficiency at the NIC clock courier, which cannot be transmitted to a counter-part apparatus by the use of the FTM action frame. Provided that this difference value is denoted by D, the time of the system clock which would be written is denoted by Tsys, and a maximum time value which can be expressed by the NIC clock is denoted by TNICMAX, D is expressed by Expression (2) below. It should be noted that here, it is assumed that Tsys and TNICMAX are not raw values of the counter but are time absolute values after a granularity difference is overcome (epoch time is 0). Further, mod indicates processing of determining a remainder of division.

[Expression 2]

$$D = T_{sys} - T_{sys} \bmod T_{NICMAX} \qquad (2)$$

In (5) above, a value corresponding to Tsys mod TNICMAX is reflected to the NIC clock. How to reflect is to directly overwrite a clock count value, gradually make that value closer to it while applying a certain filter several times, or gradually adjust that value to it by adjusting the speed of the clock count, for example.

"(b) Synchronization Processing Between NIC Clocks (Between Wireless Apparatus A-Wireless Apparatus B)"

This processing is processing of synchronizing the NIC clocks of the wireless apparatus A (wireless apparatus 100A) which is the master apparatus and the wireless apparatus B (wireless apparatus 100B) which is the slave apparatus. FIG. 6 shows a processing flow. This processing basically conforms to the FTM protocol of FIG. 2.

Figure 9:
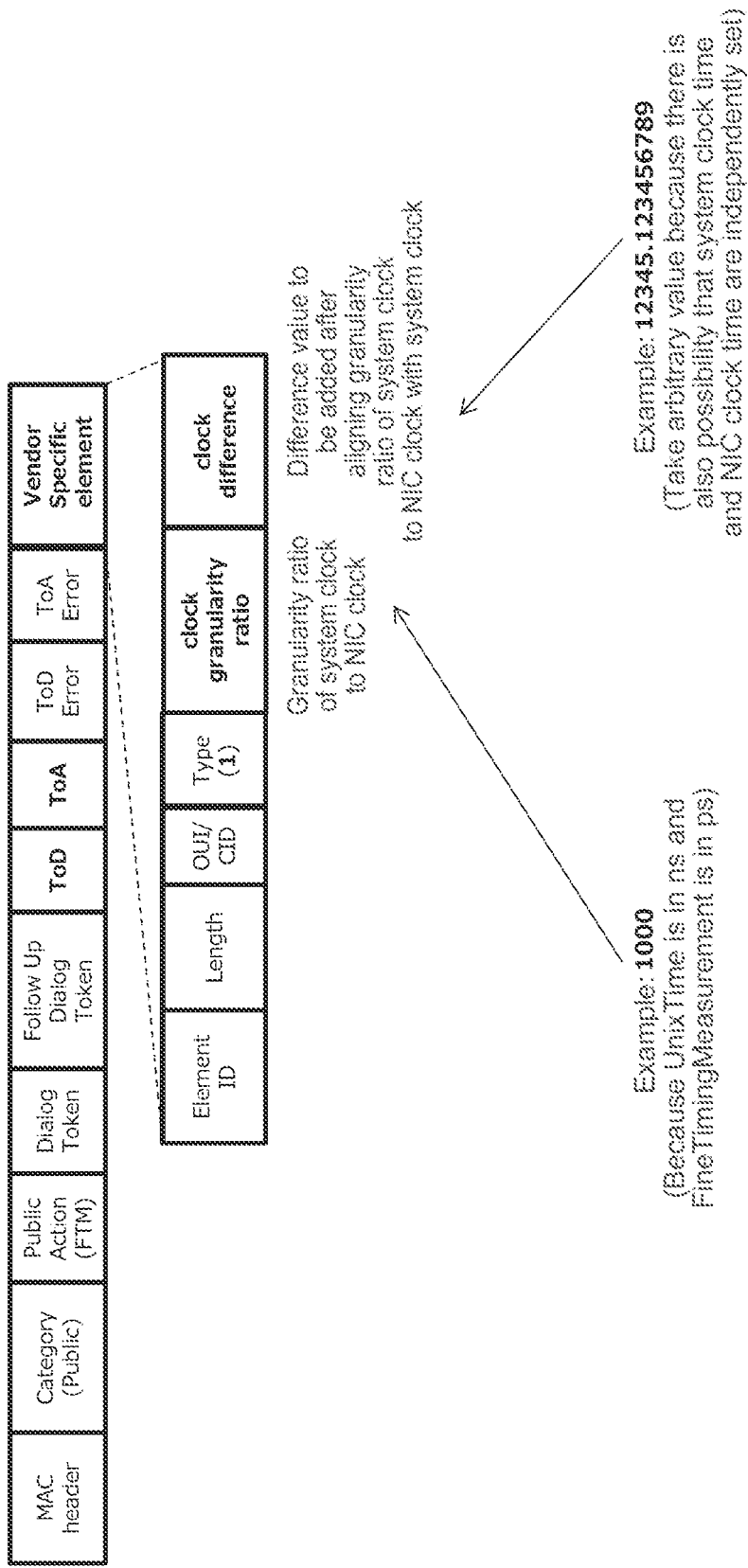
FIG. 9 A diagram showing an example of a format of an extended FTM action frame to be employed in the embodiment.

Although this processing basically conforms to the FTM protocol of FIG. 2, it is different in that a format with an extended field, which is shown in FIG. 9, is employed as the format of the FTM action frame. The wireless control unit 102 of the wireless apparatus A accesses the above-mentioned conversion parameter at the time of generating the FTM action frame and stores the contents thereof in the format of FIG. 9. It should be noted that it is assumed that in order to ensure the compatibility while distinguishing it from the format of FIG. 4, a value other than "0" is input in the "Type" field. In the example of FIG. 9, "1" is input.

In the "clock granularity ratio" field, the above-mentioned information regarding the granularity ratio is stored. As an example of the format, a numerical value of the exponent when the granularity ratio is expressed in the form of exponentiation by using 2 or 10 as the base is stored. In the "clock difference" field, information indicating the count difference between the system clock and the NIC clock is stored. As an example of the format, a count of a difference value which should be added after the granularity ratio of the system clock to the NIC clock is aligned with the system clock is stored.

In this processing, as described above, the FTM protocol is executed by employing the format with the extended field shown in FIG. 9 as the format of the FTM action frame. When receiving the FTM action frame, the wireless control unit 102 of the wireless apparatus B saves the conversion parameter described in the extended field. The wireless control unit 102 of the wireless apparatus B updates it every time the wireless control unit 102 of the wireless apparatus B receives it.

Figure 8:
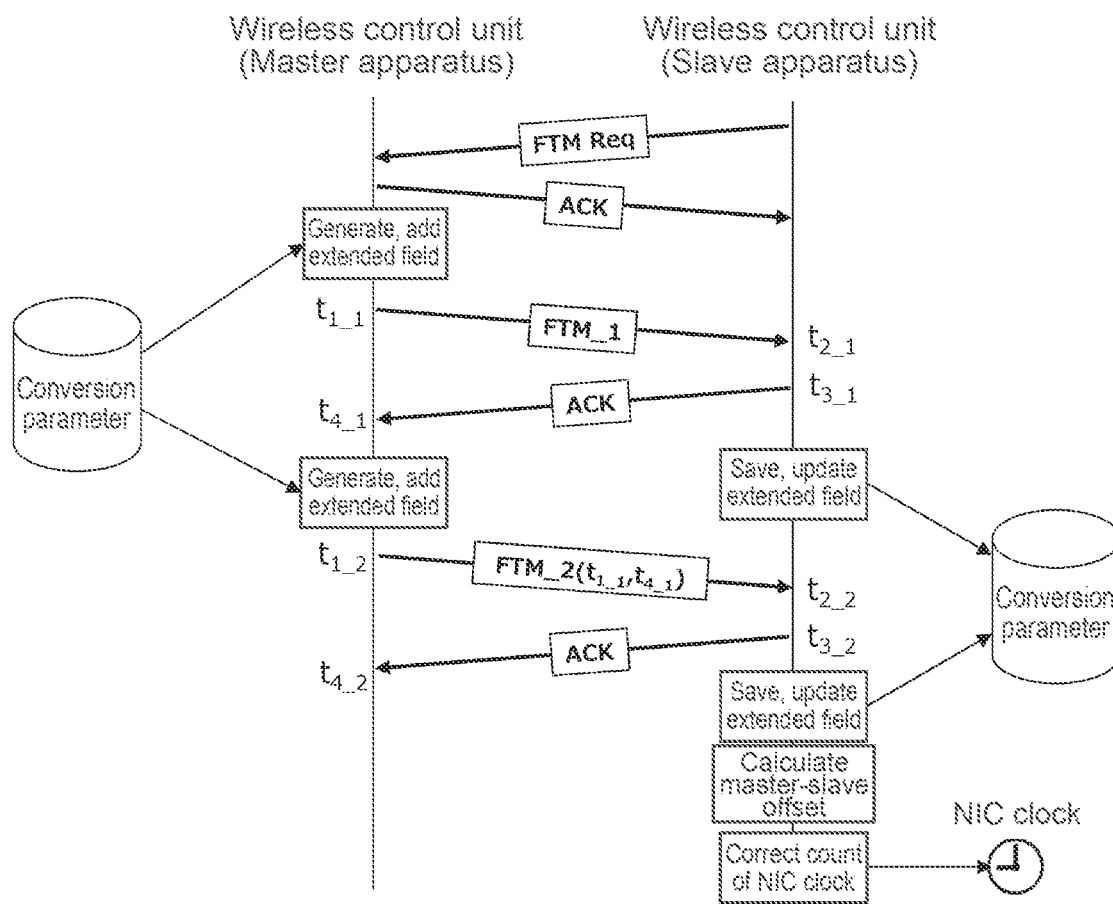
FIG. 8 A diagram showing a flow of processing of synchronizing NIC clocks of the wireless apparatus A which is the master apparatus and the wireless apparatus B which is a slave apparatus with each other.

Although a detailed description will be omitted, a calculation method for an offset between the NIC clocks is the same as the FTM protocol (in FIG. 8, access to the NIC clock is performed also in time acquisition of t1_1 to t1_4 though omitted from the figure). After the offset is calculated, the wireless control unit 102 of the wireless apparatus B corrects the count of the NIC clock in accordance with the calculated offset.

"(c) NIC Clock→System Clock Synchronization Processing (in Wireless Apparatus B)"

Figure 10:
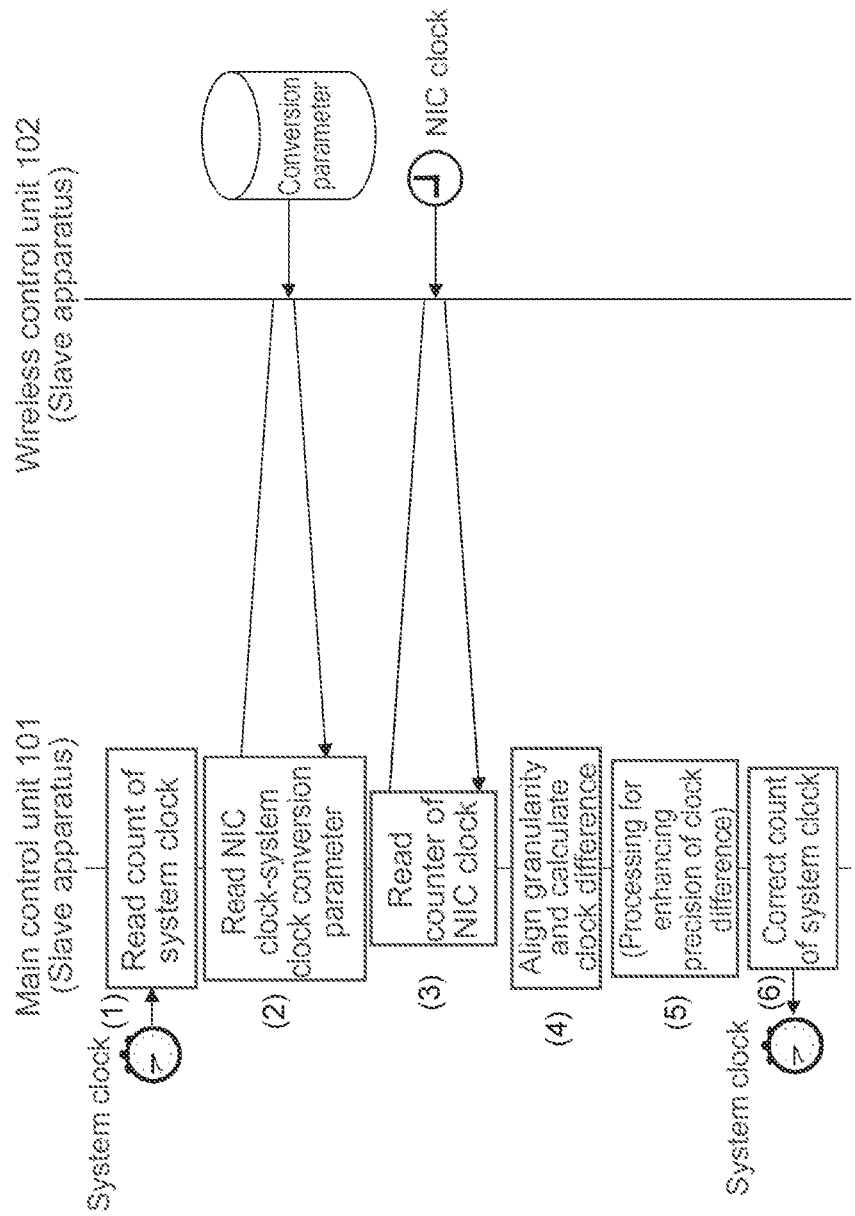
FIG. 10 A diagram showing a flow of processing of reflecting a time of the NIC clock to the system clock at the wireless apparatus B which is the slave apparatus.

This processing is processing of reflecting the time of the NIC clock to the system clock at the wireless apparatus B (wireless apparatus 100B) which is the slave apparatus. FIG. 10 shows a processing flow. Basically, an equivalent operation is performed in a reverse order to "(a) Synchronization processing of system clock→NIC clock" above.

(1) The main control unit 101 reads a count of the system clock.

(2) Next, the main control unit 101 reads a conversion parameter obtained art the wireless apparatus A and is retained at the wireless control unit 102 in the synchronization processing between the NIC clocks of (b) described above.

(3) Next, the main control unit 101 reads a count of the NIC clock.

(4) Next, the main control unit 101 applies the read conversion parameter to the read NIC clock count and calculates a count of the system clock which should be reflected. On the basis of it and the count value of the system clock read by its own apparatus, the main control unit 101 calculates a system clock difference from the clock master apparatus.

(5) Next, the main control unit 101 performs processing for enhancing the precision of the system clock difference. For example, a delay of an interface between the main control unit and the wireless control unit and a processing delay are estimated by previous measurement. A difference value from which influences thereof are removed in advance is set as a time which should be corrected. If should be noted that this processing for enhancing the precision is performed in a manner that depends on needs and does not need to be performed.

(6) Finally, the main control unit 101 corrects the count of the system clock by using the calculated system clock difference. With this, as a result, the system clocks of the main control units 101 of the wireless apparatus A and the wireless apparatus B are precisely synchronized with each other.

As described above, in the wireless system 10 shown in FIG. 1, the processing of reflecting the time of the system clock to the NIC clock at the wireless apparatus 100A, the processing of synchronizing the NIC clocks of the wireless apparatus 100A and the wireless apparatus 100B with each other, and further the processing of reflecting the time of the NIC clock to the system clock at the wireless apparatus 100B are performed. Therefore, it becomes possible to precisely synchronize the system clocks of the apparatuses with each other.

2. Modified Example

It should be noted that the example in which the synchronization protocol in the wireless layer is the fine timing measurement (FTM) protocol has been shown in the embodiment above. However, in the present technology, not only the FTM protocol but also a timing measurement (TM) protocol may be employed as one synchronization protocol in the wireless layer.

Figure 11:
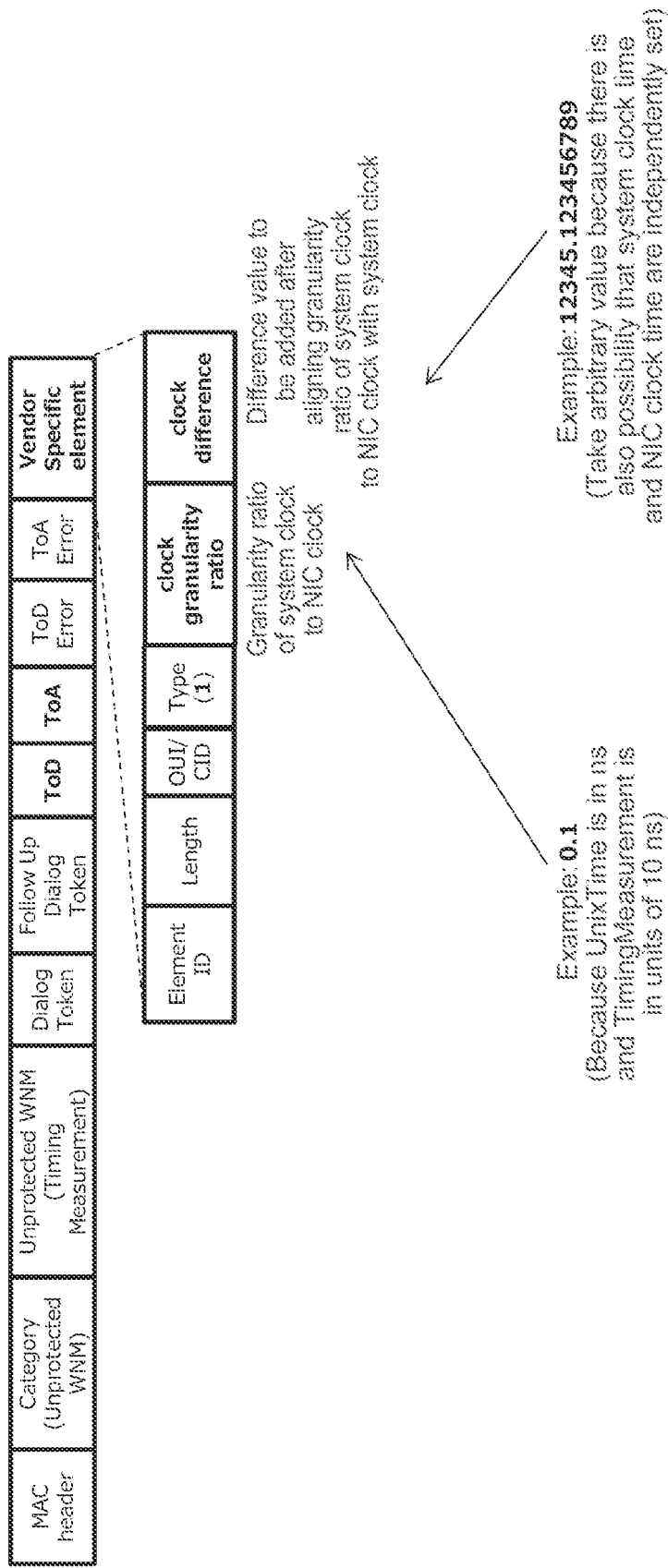
FIG. 11 A diagram showing an example of a format of a TM action frame in a case of applying the present technology to a TM protocol.

Also in that case, equivalent processing is performed as the synchronization processing between the NIC clocks of FIG. 8 described above only by replacing the FTM action frame by a timing management (TM) action frame. FIG. 11 shows a format of one TM action frame. Some fields merely have different IDs. Regarding the basic contents, the present technology can be applied in an equivalent manner to that of the FTM action frame.

Further, in the description of the embodiment above, the location where the conversion parameter is retained is the wireless control unit 102. However, the location where the conversion parameter is retained does not necessarily need to be the wireless control unit 102. The location where the conversion parameter is retained may be the main control unit 101.

Further, in the embodiment above, the "VendorSpecific" element in the processing of (b) of the synchronization procedure may be described only when the conversion parameter changes. In that case, it is assumed that the wireless apparatus 100B as the slave apparatus applies the latest received conversion parameter of the "Vendor Specific" element if the "Vendor Specific" element is not present in the FTM action frame.

Further, in the embodiment above, the conversion parameter described in the FTM action frame transmitted from the wireless apparatus 100A to the wireless apparatus 100B includes the information regarding the granularity ratio and the information regarding the count difference between the system clock and the NIC clock. However, only information regarding the count difference may be transmitted without transmitting the information regarding the granularity ratio. Further, the granularity ratio basically does not change, and thus the information regarding the granularity ratio may be separately transmitted only once by using a management frame and the like in association, which is the frame for connecting to the other wireless apparatus.

Further, in the embodiment above, regarding "correction of the NIC clock" of the processing of (b) of the synchronization procedure described above, the wireless control unit 102 directly updates the clock counter. However, the wireless control unit 102 may merely retain the offset value and the conversion may be performed by the main control unit 101.

Further, in the embodiment above, the system clock of the wireless apparatus 100A which is the master apparatus is used as a master clock of all entire systems. However, it is also conceivable that the NIC clock of the wireless apparatus 100A which is the master apparatus is used as the master clock. In that case, after only an initial value of the conversion parameter of the wireless apparatus 100A is initially given once, the processing of (c) may be performed also at the wireless apparatus 100A instead of the processing of (a) of the synchronization procedure described above.

Further, although not described above, the format of the extended FTM action frame conforming to 802.1AS and the extended field of the present technology may be both used. In that case, respective "Vendor Specific" elements are arranged in sequence.

Further, in the embodiment above, the system clocks are used as the clocks which should be synchronized between the two wireless apparatuses via the NIC clock. However, clocks that manage times of medium processing units for audio, video, and the like may be used as those clocks. It should be noted that although a detail led description will be omitted, equivalent processing to that in the case of the embodiment above is performed as the synchronization procedure only by replacing the system clock of the main control unit 101 by the clock of the medium processing unit.

Figure 12:
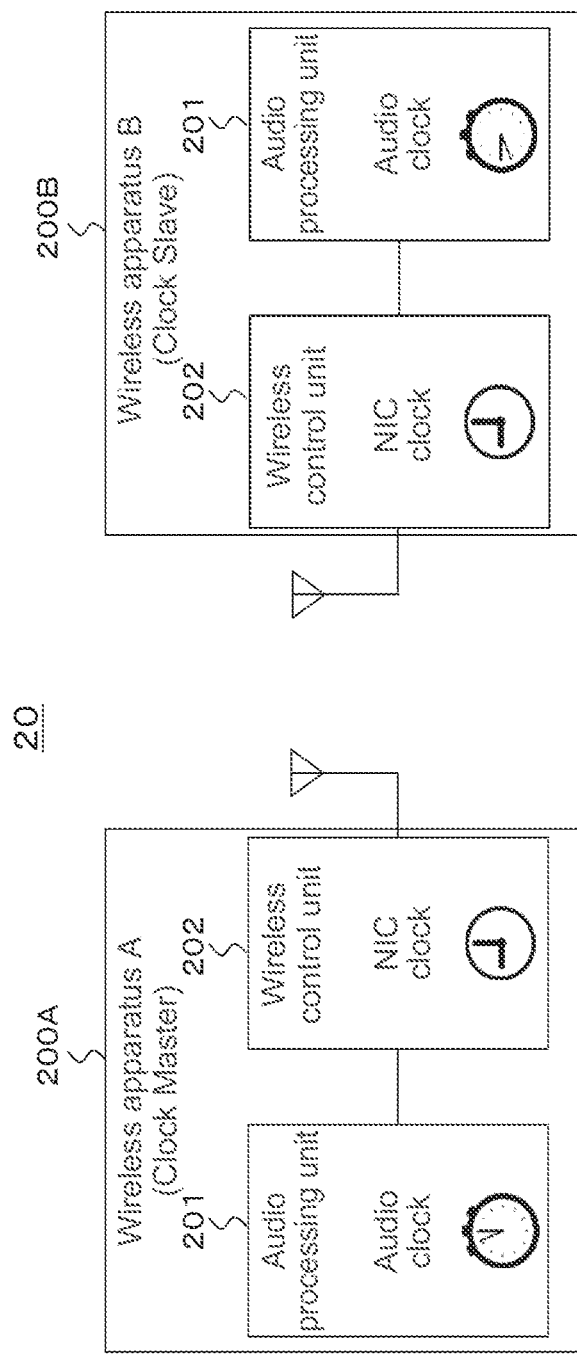
FIG. 12 A block diagram showing another configuration example of the wireless system.

FIG. 12 shows a configuration example of a wireless system 20 in that case. This wireless system 20 includes a wireless apparatus 200A and a wireless apparatus 200B. The wireless apparatuses 200A and 200B each include a medium processing unit, here, an audio processing unit 201 and a wireless control unit 202. In this wireless system 20, it becomes possible to precisely synchronize the clocks of the medium processing units (here, clocks for audio) of the apparatuses with each other.

Figure 13:
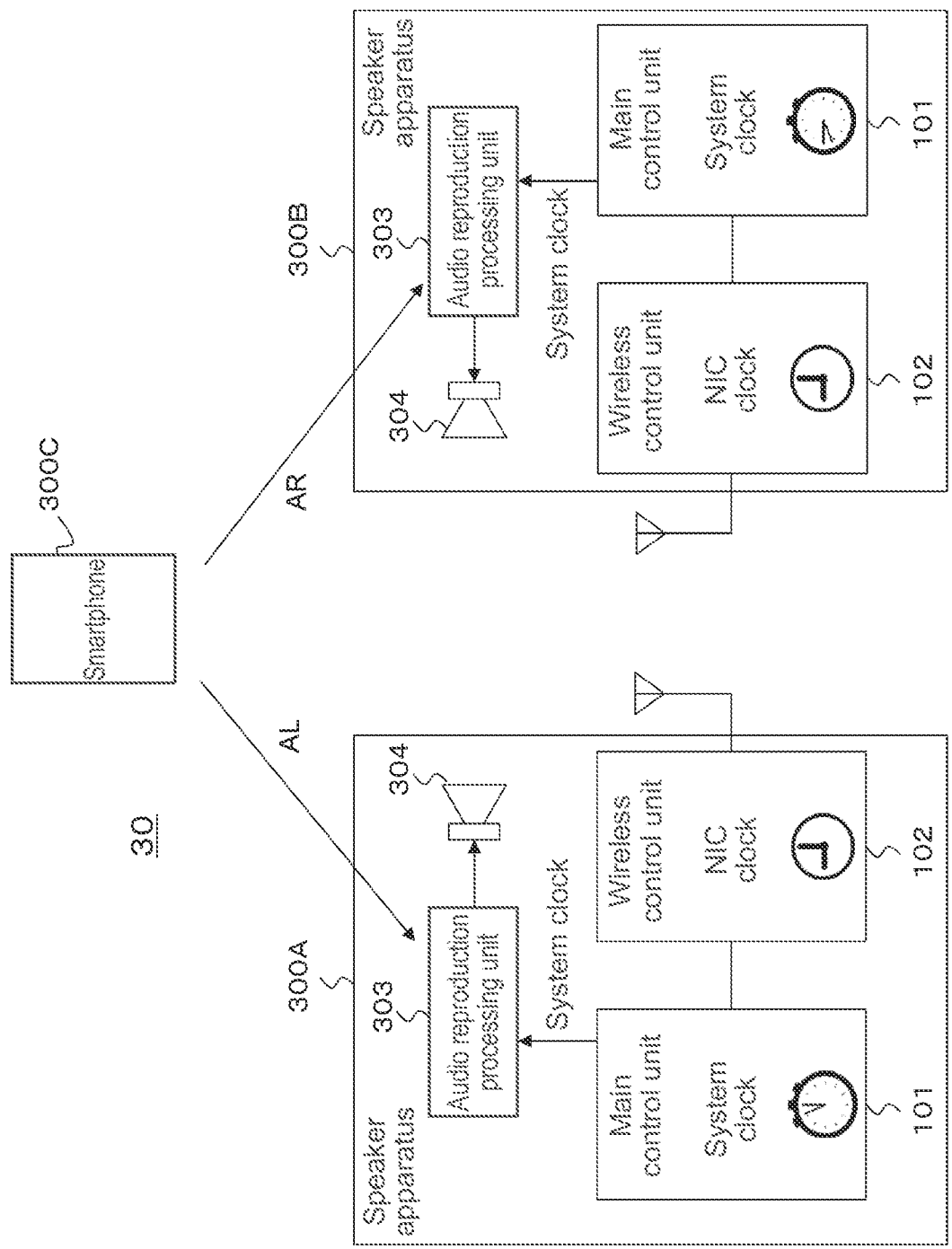
FIG. 13 A block diagram showing another configuration example of the wireless system.

Further, FIG. 13 shows a configuration example of a wireless system (speaker system) 30 that precisely synchronizes the system clocks of the apparatuses with each other as described above. In this FIG. 13, portions corresponding to those of FIG. 5 will be denoted by the same signs and detailed descriptions thereof will be omitted as appropriate.

This wireless system 30 includes a speaker apparatus 300A that constitutes the wireless apparatus (master apparatus), a speaker apparatus 300B that constitutes the wireless apparatus (slave apparatus), and a smartphone 300C which is an audio data supply source.

The speaker apparatuses 300A and 300B each include a main control unit 101, a wireless control unit 102, an audio reproduction processing unit 303, and a speaker 304. The main control unit 101 and the wireless control unit 102 are configured in a manner similar to that of the main control unit 101 and the wireless control unit 102 in the wireless system 10 of FIG. 5. The processing of the synchronization procedure of (a) to (c) is performed. The system clocks of the main control units 101 in the speaker apparatuses 300A and 300B are precisely synchronized with each other.

The audio reproduction processing unit 303 of the speaker apparatus 300A wirelessly receives stereo left audio data AL from the smartphone 300C, drives the speaker 304 by performing reproduction processing on the basis of the system clock of the main control unit 101, and causes left audio to be output from this speaker 304. On the other hand, the audio reproduction processing unit 303 of the speaker apparatus 300B wirelessly receives stereo right audio data AR from the smartphone 300C, drives the speaker 304 by performing reproduction processing on the basis of the system clock of the main control unit 101, and causes right audio to be output from this speaker 304.

Here, regarding the audio data AL and AR, all the data may be transmitted from the smartphone 300C to the speaker apparatus 300A which is the master apparatus, and then 300B which is the slave apparatus may wirelessly receive the audio data AR wirelessly sent from 300A which is the master apparatus. Similar processing is performed as the reproduction processing in the master apparatus and the slave apparatus.

In this wireless system 30, the system clocks of the main control units 101 of the speaker apparatuses 300A and 300B are precisely synchronized with each other by the processing of the synchronization procedure of (a) to (c). Then, the audio reproduction processing unit 303 of each of the speaker apparatuses 300A and 300B performs the reproduction processing on the basis of the system clock of the main control unit 101. Therefore, the left audio and right audio output from the respective speakers 304 of the speaker apparatuses 300A and 300B are precisely synchronized with each other, and it becomes possible to obtain favorable stereo reproduced audio.

It should be noted, that although the example in which the wireless system 30 of FIG. 13 performs stereo reproduction has been shown, a wireless system that performs multi-channel reproduction can be configured in a similar manner. Further, although the wireless system 30 of FIG. 13 is an example of audio reproduction, a similar configuration can be applied also to video reproduction which should be displayed in synchronization as a matter of course.

Further, a wireless system (speaker system) associated with wireless transmission or reception of audio data may be configured with respect to apparatuses having the configurations of the wireless apparatuses in the wireless system 20 of FIG. 12. Also, in that case, transmission/reception processing and reproduction processing similar to those in the case of the wireless system 30 of FIG. 13 can be applied except for the point that clocks used for reproduction are audio clocks, not the system clocks.

Further, the present technology can also take configurations as follows.

(1) A wireless apparatus, including:
a main control unit; and
a wireless control unit that wirelessly sends information regarding a correspondence between a clock that manages a time of the main control unit and a clock that manages a time of the wireless control unit to another wireless apparatus, the information regarding the correspondence including information regarding a difference between the two clocks.

(2) The wireless apparatus according to (1), in which the information regarding the correspondence further includes information regarding a granularity ratio of the two clocks.

(3) The wireless apparatus according to (1) or (2), in which
the wireless control unit sends the information regarding the correspondence as a part of a frame for measuring the time of the wireless control unit with respect to the other wireless apparatus.

(4) The wireless apparatus according to (1) or (2), in which
the wireless control unit sends the information regarding the correspondence as a part of a frame for connecting to the other wireless apparatus.

(5) The wireless apparatus according to any of (1) to (4), farther including
an audio reproduction processing unit that wirelessly receives audio data from an external apparatus and drives a speaker by performing reproduction processing on the basis of the clock that manages the time of the main control unit.

(6) The wireless apparatus according to any of (1) to (4), further including
an studio reproduction processing unit that wirelessly sends audio data to an external apparatus and drives a speaker by performing reproduction processing on the basis of the clock that manages the time of the main control unit also by itself.

(7) A processing method for a wireless apparatus including a main control unit and a wireless control unit, including
a step of, by the wireless control unit, wirelessly sending information regarding a correspondence between a clock tin at manages a time of the main control unit and a clock that manages a time of the wireless control unit to another wireless apparatus, the information regarding the correspondence including information regarding a difference between the two clocks.

(8) A program that causes a computer that controls an operation of a wireless apparatus including a main control unit and a wireless control unit to execute a processing method including
a step of, by the wireless control unit, wirelessly sending information regarding a correspondence between a clock that manages a time of the main control unit and a clock that manages a time of the wireless control unit to another wireless apparatus, the information regarding the correspondence including information regarding a difference between the two clocks.

(9) A wireless apparatus, including:
a main control unit;
a wireless control unit that receives, from another wireless apparatus, information regarding a correspondence between a clock that manages a time of a main control unit and a clock that manages a time of a wireless control unit in the other wireless apparatus, the information regarding the correspondence including information regarding a difference between the two clocks; and
a correction unit that corrects a clock that manages a time of the main control unit of its own apparatus by converting the clock that manages a time of the wireless control unit of its own apparatus into the clock that manages the time of the main control unit of its own apparatus on the basis of the information regarding the correspondence.

(10) The wireless apparatus according to (9), in which
the information regarding the correspondence further includes information regarding a granularity ratio of the two clocks.

(11) The wireless apparatus according to (9) or (10), further including
an audio reproduction processing unit that wirelessly receives audio data from an external apparatus and drives a speaker by performing reproduction processing on the basis of the clock that manages the time of the main control unit.

(12) The wireless apparatus according to (9) or (10), further including
an audio reproduction processing unit that wirelessly sends audio data to an external apparatus and drives a speaker by performing reproduction processing on the basis of the clock that manages the time of the main control unit also by itself.

(13) A processing method for a wireless apparatus including a main control unit and a wireless control unit, including:
a reception step of, by the wireless control unit, receiving, from another wireless apparatus, information regarding a correspondence between a clock that manages a time of a main control unit and a clock that manages a time of a wireless control unit in the other wireless apparatus; and
a correction step of, by a correction unit, correcting a clock that manages a time of the main control unit of its own apparatus by converting a clock that manages a time of the wireless control unit of its own apparatus into the clock that manages the time of the main control unit of its own apparatus on the basis of the information regarding the correspondence, the information regarding the correspondence including information regarding a difference between the two clocks.

(14) A program that causes a computer that controls an operation of a wireless apparatus including a main control unit and a wireless control unit to execute a processing method including:
a reception step of, by the wireless control unit, receiving, from another wireless apparatus, information regarding a correspondence between a clock that manages a time of a main control unit and a clock that manages a time of a wireless control unit in the other wireless apparatus; and
a correction step of, by a correction unit, correcting a clock that manages a time of the main control unit of its own apparatus by converting a clock that manages a time of the wireless control unit of its own apparatus into the clock that manages the time of the main control unit of its own apparatus on the basis of the information regarding the correspondence, the information regarding the correspondence including information regarding a difference between the two clocks.

(15) A wireless apparatus, including:
a medium processing unit; and
a wireless control unit that wirelessly sends information regarding a correspondence between a clock that manages a time of the medium processing unit and a clock that manages a time of the wireless control unit to another wireless apparatus, the information regarding the correspondence including information regarding a difference between the two clocks.

(16) The wireless apparatus according to (15), in which the medium processing unit wirelessly receives audio data from an external apparatus and drives a speaker by performing reproduction processing on the basis of she clock that manages the time of the medium processing unit.

(17) The wireless apparatus according to (15), in which the medium processing unit wirelessly sends audio data to an external apparatus and drives a speaker by performing reproduction processing on the basis of the clock that manages the time of the medium processing unit also by itself.

(18) A wireless apparatus, including:
a medium processing unit;
a wireless control unit that receives, from another wireless apparatus, information regarding a correspondence between a clock that manages a time of the medium processing unit, and a clock that manages a time of the wireless control unit in the other wireless apparatus, the information regarding the correspondence including information regarding a difference between the two clocks; and
a correction unit that corrects a clock that manages a time of the medium processing unit of its own apparatus by converting a clock that manages a time of the wireless control unit of its own apparatus into the clock that manages the time of the medium processing unit, of its own apparatus on the basis of the information regarding the correspondence.

(19) The wireless apparatus according to (18), in which the medium processing unit wirelessly receives audio data from an external apparatus and drives a speaker by performing reproduction processing on the basis of the clock that manages the time of the medium processing unit.

(20) The wireless apparatus according to (18), in which the medium processing unit wirelessly sends audio data to an external apparatus and drives a speaker by performing reproduction processing on the basis of the clock that manages the time of the medium processing unit also by itself.

REFERENCE SIGNS LIST 10, 20, 30 wireless system
100A, 100B wireless apparatus
101 main control unit
102 wireless control unit
200A, 200B wireless apparatus
201 audio processing unit
202 wireless control unit
300A, 300B speaker apparatus
300C smartphone
303 audio reproduction processing unit
304 speaker

The invention claimed is:
1. A wireless apparatus, comprising:
a main control unit; and
a wireless control unit that wirelessly sends information regarding a correspondence between a clock that manages a time of the main control unit and a clock that manages a time of the wireless control unit to another wireless apparatus, the information regarding the correspondence including information regarding a difference between the two clocks,
wherein the difference comprises a count difference between the two clocks calculated after aligning a granularity of the clock that manages the time of the main control unit to a granularity of the clock that manages the time of the wireless control unit, wherein the clock that manages the time of the wireless control unit expresses a time count with a bit width and granularity different from the clock that manages the time of the main control unit.

2. The wireless apparatus according to claim 1, wherein the information regarding the correspondence further includes information regarding a granularity ratio of the two clocks.

3. The wireless apparatus according to claim 1, wherein the wireless control unit sends the information regarding the correspondence as a part of a frame for measuring the time of the wireless control unit with respect to the other wireless apparatus.

4. The wireless apparatus according to claim 1, wherein the wireless control unit sends the information regarding the correspondence as a part of a frame for connecting to the other wireless apparatus.

5. The wireless apparatus according to claim 1, further comprising
an audio reproduction processing unit that wirelessly receives audio data from an external apparatus and drives a speaker by performing reproduction processing on a basis of the clock that manages the time of the main control unit.

6. The wireless apparatus according to claim 1, further comprising
an audio reproduction processing unit that wirelessly sends audio data to an external apparatus and drives a speaker by performing reproduction processing on a basis of the clock that manages the time of the main control unit also by itself.

7. A processing method for a wireless apparatus including a main control unit and a wireless control unit, comprising
a step of, by the wireless control unit, wirelessly sending information regarding a correspondence between a clock that manages a time of the main control unit and a clock that manages a time of the wireless control unit to another wireless apparatus, the information regarding the correspondence including information regarding a difference between the two clocks,
wherein the difference comprises a count difference between the two clocks calculated after aligning a granularity of the clock that manages the time of the main control unit to a granularity of the clock that manages the time of the wireless control unit, wherein the clock that manages the time of the wireless control unit expresses a time count with a bit width and granularity different from the clock that manages the time of the main control unit.

8. A non-transitory computer-readable recording medium that stores therein a computer program product, which, when executed by a processor, causes a computer that controls an operation of a wireless apparatus including a main control unit and a wireless control unit to execute a processing method comprising
a step of, by the wireless control unit, wirelessly sending information regarding a correspondence between a clock that manages a time of the main control unit and a clock that manages a time of the wireless control unit to another wireless apparatus, the information regarding the correspondence including information regarding a difference between the two clocks,
wherein the difference comprises a count difference between the two clocks calculated after aligning a granularity of the clock that manages the time of the main control unit to a granularity of the clock that manages the time of the wireless control unit, wherein the clock that manages the time of the wireless control unit expresses a time count with a bit width and granularity different from the clock that manages the time of the main control unit.

9. A wireless apparatus, comprising:
a main control unit;
a wireless control unit that receives, from another wireless apparatus, information regarding a correspondence between a clock that manages a time of a main control unit and a clock that manages a time of a wireless control unit in the other wireless apparatus, the information recording the correspondence including information regarding a difference between the two clocks,
wherein the difference comprises a count difference between the two clocks calculated after aligning a granularity of the clock that manages the time of the main control unit to a granularity of the clock that manages the time of the wireless control unit, wherein the clock that manages the time of the wireless control unit expresses a time count with a bit width and granularity different from the clock that manages the time of the main control unit; and
a correction unit that corrects a clock that manages a time of the main control unit of its own apparatus by converting the clock that manages a time of the wireless control unit of its own apparatus into the clock that manages the time of the main control unit of its own apparatus on a basis of the information regarding the correspondence.

10. The wireless apparatus according to claim 9, wherein the information regarding the correspondence further includes information regarding a granularity ratio of the two clocks.

11. The wireless apparatus according to claim 9, further comprising
an audio reproduction processing unit that wirelessly receives audio data from an external apparatus and drives a speaker by performing reproduction processing on a basis of the clock that manages the time of the main control unit.

12. The wireless apparatus according to claim 9, further comprising
an audio reproduction processing unit that wirelessly sends audio data to an external apparatus and drives a speaker by performing reproduction processing on a basis of the clock that manages the time of the main control unit also by itself.

13. A processing method for a wireless apparatus including a main control unit and a wireless control unit, comprising:
a reception step of, by the wireless control unit, receiving, from another wireless apparatus, information regarding a correspondence between a clock that manages a time of a main control unit and a clock that manages a time of a wireless control unit in the other wireless apparatus; and
a correction step of, by a correction unit, correcting a clock that manages a time of the main control unit of its own apparatus by converting a clock that manages a time of the wireless control unit of its own apparatus info the clock that manages the time of the main control unit of its own apparatus on a basis of the information regarding the correspondence, the information regarding the correspondence including information regarding a difference between the two clocks,
wherein the difference comprises a count difference between the two clocks calculated after aligning a granularity of the clock that manages the time of the main control unit to a granularity of the clock that manages the time of the wireless control unit, wherein the clock that manages the time of the wireless control unit expresses a time count with a bit width and granularity different from the clock that manages the time of the main control unit.

14. A non-transitory computer-readable recording medium that stores therein a computer program product, which, when executed by a processor, causes a computer that controls an operation of a wireless apparatus including a main control unit and a wireless control unit to execute a processing method comprising:

a reception step of, by the wireless control unit, receiving, from another wireless apparatus, information regarding a correspondence between at clock that manages a time of a main control unit and a clock that manages a time of a wireless control unit in the other wireless apparatus; and a correction step of, by a correction unit, correcting a clock that manages a time of the main control unit of its own apparatus by converting a clock that a time of the wireless control unit of its own apparatus into the clock that manages the time of the main control unit of its own apparatus on a basis of the information regarding the correspondence, the information regarding the correspondence including information regarding a difference between the two clocks, wherein the difference comprises a count difference between the two clocks calculated after aligning a granularity of the clock that manages the time of the main control unit to a granularity of the clock that manages the time of the wireless control unit, wherein the clock that manages the time of the wireless control unit expresses a time count with a bit width and granularity different from the clock that manages the time of the main control unit.

15. A wireless apparatus, comprising:

a medium processing unit; and a wireless control unit that wirelessly sends information regarding a correspondence between a clock that manages a time of the medium processing unit and a clock that manages a time of the wireless control unit to another wireless apparatus, the information regarding the correspondence including information regarding a difference between the two clocks, wherein the difference comprises a count difference between the two clocks calculated after aligning a granularity of the clock that manages the time of the main control unit to a granularity of the clock that manages the time of the wireless control unit, wherein the clock that manages the time of the wireless control unit expresses a time count with a bit width and granularity different from the clock that manages the time of the main control unit.

16. The wireless apparatus according to claim 15, wherein the medium processing unit wirelessly receives audio data from an external apparatus and drives a speaker by performing reproduction processing on a basis of the clock that manages the time of the medium processing unit.

17. The wireless apparatus according to claim 15, wherein the medium processing unit wirelessly sends audio data to an external apparatus and drives a speaker by performing reproduction processing on a basis of the clock that manages the time of the medium processing unit by itself.

18. A wireless apparatus, comprising:

a medium processing unit;

a wireless control unit that receives, from another wireless apparatus, information regarding a correspondence between a clock that manages a time of the medium processing unit and a clock that managers a time of the wireless control unit in the other wireless apparatus, the information regarding the correspondence including information regarding difference between the two clocks, wherein the difference comprises a count difference between the two clocks calculated after aligning a granularity of the clock that manages the time of the main control unit to a granularity of the clock that manages the time of the wireless control unit, wherein the that manages the time of the wireless control unit expresses a time count with a bit width and granularity different from the clock that manages the time of the main control unit; and a correction unit that corrects a clock that manages a time of the medium processing unit of its own apparatus by converting a clock that manages a time of the wireless control unit of its own apparatus into the clock that manages the time of the medium processing unit of its own apparatus on a basis of the information regarding the correspondence.

19. The wireless apparatus according to claim 18, wherein the medium processing unit wirelessly receives audio data from an external apparatus and drives a speaker by performing reproduction processing on a basis of the clock that manages the time of the medium processing unit.

20. The wireless apparatus according to claim 18, wherein the medium processing unit wirelessly sends audio data to an external apparatus and drives a speaker by performing reproduction processing on a basis of the clock that manages the time of the medium processing unit also by itself.

* * * * *